(12) United States Patent
Kury (10) Patent No.: US 12,392,120 B2
(45) Date of Patent: Aug. 19, 2025

(54) WATER-CONDUCTING ARRANGEMENT (71) Applicant: Neoperl GmbH, Müllheim (DE)

(72) Inventor: Werner Kury, Müllheim (DE)

(73) Assignee: NEOPERL GMBH, Mullheim (DE)

( * ) Notice: Subject to any disclaimer, the term of this patent is extended or adjusted under 35 U.S.C. 154(b) by 346 days.

(21) Appl. No.: 18/015,343

(22) PCT Filed: Jul. 26, 2021

(86) PCT No.: PCT/EP2021/070856
§ 371 (c)(1),
(2) Date: Jan. 10, 2023

(87) PCT Pub. No.: WO2022/023265
PCT Pub. Date: Feb. 3, 2022

(65) Prior Publication Data
US 2023/0279648 A1    Sep. 7, 2023

(30) Foreign Application Priority Data

Jul. 29, 2020 (DE) .................... 20 2020 104 394.3
Sep. 18, 2020 (DE) .................... 20 2020 105 356.6

(51) Int. Cl.
*E03C 1/04* (2006.01)
*F16L 33/28* (2006.01)

(52) U.S. Cl.
CPC .......... *E03C 1/0403* (2013.01); *E03C 1/0404* (2013.01); *F16L 33/28* (2013.01)

(58) Field of Classification Search
CPC ....... E03C 1/0403; E03C 1/0404; F16L 33/28
USPC .................................... 4/675–678
See application file for complete search history.

(56) References Cited

U.S. PATENT DOCUMENTS

| | | | |
|---|---|---|---|
| 1,537,797 A * | 5/1925 | Bunbury | F16L 37/48 285/8 |
| 2,279,733 A | 4/1942 | Cross | |
| 2,286,105 A | 6/1942 | Quinn | |
| 2,326,213 A * | 8/1943 | Gorrien | F16L 37/082 285/8 |
| 4,018,493 A * | 4/1977 | Lyman | A47L 9/246 439/877 |
| 4,550,892 A * | 11/1985 | Whitley | B05B 15/62 248/90 |
| 4,667,987 A | 5/1987 | Knebel | |
| 4,903,922 A * | 2/1990 | Harris, III | A01G 25/00 248/301 |
| 5,005,790 A * | 4/1991 | Harris, III | A01G 25/00 248/301 |

(Continued)

FOREIGN PATENT DOCUMENTS

| | | | | |
|---|---|---|---|---|
| AU | 2021316503 A1 * | 2/2023 | | E03C 1/021 |
| CA | 3013133 | 2/2020 | | |

(Continued)

OTHER PUBLICATIONS

Chinese Office Action issued Feb. 3, 2023 for Chinese Patent Application No. 202011359590.9.

*Primary Examiner* — Lori L Baker
(74) *Attorney, Agent, or Firm* — Volpe Koenig (57) ABSTRACT

In a water-conducting arrangement (1), a holding lip (7) is integrally molded on an end (6) of the connecting hose (4), with the holding lip (7) engaging behind a hose receptacle (12) in order for the connecting hose (4) to be suspended.

19 Claims, 6 Drawing Sheets

(56) References Cited

U.S. PATENT DOCUMENTS

| | | |
|---|---|---|
| 5,958,338 A | 9/1999 | Lindsay et al. |
| 2004/0061334 A1 | 4/2004 | Kruck |
| 2009/0050213 A1 | 2/2009 | Biddell et al. |
| 2011/0089263 A1 | 4/2011 | Hughett et al. |
| 2014/0318660 A1 | 10/2014 | Di Leo |
| 2017/0073943 A1* | 3/2017 | Stoelzel ............... E03C 1/08 |
| 2018/0049381 A1* | 2/2018 | Parod ............... A01G 25/092 |
| 2023/0279648 A1* | 9/2023 | Kury ............... E03C 1/0404 |
| | | 137/801 |

FOREIGN PATENT DOCUMENTS

| CH | 657403 | | 8/1986 | | |
|---|---|---|---|---|---|
| CN | 1782481 A | | 6/2006 | | |
| CN | 201803027 U | | 4/2011 | | |
| CN | 202992312 U | | 6/2013 | | |
| CN | 105899872 A | | 8/2016 | | |
| CN | 108603364 | | 9/2018 | | |
| CN | 215335051 U | | 12/2021 | | |
| CN | 215596637 U | | 1/2022 | | |
| CN | 116134197 A | | 5/2023 | | |
| CN | 117587616 A | * | 2/2024 | ............ | D06F 35/00 |
| DE | 2852856 A1 | | 6/1980 | | |
| DE | 8501281 | | 7/1986 | | |
| DE | 10330685 | | 2/2005 | | |
| DE | 102011076829 | | 7/2015 | | |
| DE | 202019004294 U1 | | 11/2019 | | |
| EP | 2592270 | | 5/2013 | | |
| EP | 3103913 A1 | * | 12/2016 | ............ | D06F 39/08 |
| EP | 3208390 | | 8/2017 | | |
| EP | 3557108 A1 | | 10/2019 | | |
| FR | 1146949 | | 11/1957 | | |
| GB | 1597372 A | | 9/1981 | | |
| JP | S62202593 U | | 12/1987 | | |
| JP | 2017137917 A | | 8/2017 | | |
| JP | 7419162 B2 | * | 1/2024 | ............ | E03C 1/021 |
| WO | WO-2015060992 A1 | * | 4/2015 | .......... | B01D 36/006 |
| WO | 2017129363 | | 8/2017 | | |

\* cited by examiner

WATER-CONDUCTING ARRANGEMENT

TECHNICAL FIELD

The invention relates to a water-conducting arrangement having a functional unit and at least one connecting hose.

BACKGROUND

Water-conducting arrangements of this type are known and are used in sanitary fittings, for example. The connecting hoses often serve for separating the function of a water supply to a functional unit, for example a valve or a water outlet, from the function of a mechanical mounting of the functional unit on the sanitary fitting. This often results in that a fluidic connection of the connecting hose to the functional unit is disposed so as to be hidden in the sanitary fitting in the use position.

SUMMARY

The invention is based on the object of achieving in a water-conducting arrangement a fluidic connection which is easy to produce.

In order for the mentioned object to be achieved, one or more of the features provided according to the invention are used. In a water-conducting arrangement of the type mentioned at the outset it is thus proposed in particular according to the invention that, on an end of the connecting hose that faces the functional unit, a molded holding lip is integrally configured and that the holding lip is suspended on a hose receptacle of the valve. In this way, a hose stem on the connecting hose can be dispensed with. This simplifies the production of the fluidic connection. When a hose stem is no longer required, an available internal cross section can be increased while maintaining the external dimensions. This is favorable with a view to an ideally low flow resistance.

For example, the functional unit can be a valve or a water outlet. In this way, the invention can advantageously be used in functional units which are disposed in tight space conditions.

For example, the connecting hose can be an inflow hose. In this way, the invention can also be used in connecting hoses with a comparatively high operating pressure. It can be provided here, for example, that the connecting hose is a cold water hose. This can have a positive influence on a long-term stability of the fluidic connection.

For example, the connecting hose can also be an outlet hose. Here the invention utilizes the fact that an operating pressure on the outflow side of a functional unit is often significantly lower than at the inflow side because of the pressure drop across the functional unit.

In one design embodiment of the invention it can be provided that the connecting hose is made from a thermoplastics material. In this way, the holding lip can be shaped in a particularly simple manner.

In one design embodiment of the invention it can be provided that the holding lip is configured by thermoplastic forming. It is advantageous here that the connecting hose can be made from an extruded material. In this case, the holding lip can be molded after the connecting hose has been cut to length, for example.

In one design embodiment of the invention it can be provided that the hose receptacle is open laterally. In this way, the connecting hose does not have to be threaded into said hose receptacle.

In one design embodiment of the invention it can be provided that the hose receptacle is configured so as to be closed in an encircling manner. In this way, the holding lip can be supported along the entire circumference.

In one design embodiment of the invention it can be provided that a radially acting tie is configured on the holding lip. In this way, an anti-extraction safeguard can be provided. This is particularly favorable in the case where the connecting hose is partially or fully compromised in terms of its dimensional stability as a result of being heated with flowing hot water.

It can be provided here for example that the tie is configured as a groove or a rib. In this way, a form-fit between the holding lip and the hose receptacle can be established using simple means. The hose receptacle can be provided with a corresponding shape, in particular on a bearing face, for example.

The groove or the rib can be configured so as to be encircling, for example, so as to hold the holding lip on all sides.

In one design embodiment of the invention it can be provided that the holding lip is pressed against a bearing face on the hose receptacle. It can be prevented in this way that the holding lip slips out. It is particularly favorable here for the tie already described to be configured on the holding lip. As a result of the contact pressure it can be achieved that the form-fit of the tie is not unintentionally released even at hot water temperatures.

In one design embodiment of the invention it can be provided that a bearing face, for example the bearing face already mentioned, on the hose receptacle is configured so as to correspond to the holding lip. A form-fit can be established in this way.

It can be provided here, for example, that a radially acting mating tie is formed in this way. A particularly strong grip of the holding lip can be achievable as a result of the mutual engagement of the tie and the mating tie.

This can be specified, for example, by a form-fit between the hose receptacle and the holding lip.

A simple design embodiment of a form-fit is provided by at least one, preferably encircling, rib which engages in a groove. Additional sealing can be achievable as a result.

The at least one rib here can be configured on the bearing face and/or on the holding lip, for example.

In one design embodiment of the invention it can be provided that the hose receptacle has an encircling support disk on which the holding lip bears. It is advantageous here that it can be achieved that the holding lip is supported on all sides, independently of the configuration of the functional unit, in particular when the hose receptacle is open laterally.

The support disk is preferably configured so as to be removable. This may simplify disassembly. Different materials for the support disk and for a support plate supporting the support disk can also be selected.

For example, it can be provided that the support disk is configured as a stamping and/or bent part. In this way, the support disk can be made from metal, for example, while the previously mentioned support plate of the functional unit can be made from plastics material.

It can be provided, for example, that the support disk is configured as a diecast part, in particular as a zinc diecast part. In this way, alternative materials can be used.

Alternatively or additionally it can be provided that the support disk is configured as a plastics part. The latter can be thermoplastic, for example, so as to allow simple production.

Alternatively or additionally it can be provided that sharp-edged structures are configured for the holding lip on a bearing face, in particular the bearing face already described. These sharp-edged structures can dig into the holding lip in order for the latter to be held in a form-fitting manner. This can be achieved in a particularly simple manner if the support disk is a, for example metallic, stamping and/or bent part and/or a diecast part, in particular a zinc diecast part.

The sharp-edged structures here can have at least one holding claw, for example. Structures which can be made in a particularly simple manner are thus described.

In one design embodiment of the invention it can be provided that a sealing face is configured on the end of the connecting hose. It is advantageous here that a sealing function can be integrated in the holding lip. Further sealing means can be dispensed with. In this way, the connecting hose can be made from a single component because an annular seal or another sealing means can be provided on the functional unit.

The sealing face here can be configured in an encircling manner, for example. Sealing on all sides is achievable in this way.

It can be provided that the sealing face acts axially. In this way, a contact pressure, in particular the previously described contact pressure, on the holding lip can be utilized for sealing.

Alternatively or additionally it can be provided that the sealing face acts radially. This thus describes an arrangement with a sealing effect that is independent of a contact pressure on the holding lip.

In one design embodiment of the invention it can be provided that an axially acting sealing face is configured on an inflow side of the holding lip. An annular seal can thus be easily placed thereon.

It can be provided here that an axially acting mating sealing face is configured on the valve. Said axially acting mating sealing face may be able to be provided for example by an inserted annular seal.

In one design embodiment of the invention it can be provided that a radially acting sealing face is configured on a neck which on the inflow side projects beyond the holding lip. A radial seal which can be easily produced, in particular by thermoplastic forming, can be configured in this way.

It can be provided here that a radially acting mating sealing face is configured on the valve. It is advantageous here that a contact pressure of the valve can be used for forming a seal. Here too, the mating sealing face can be configured on an annular seal.

In one design embodiment of the invention it can be provided that an encircling rim of an entry opening on the end of the connecting hose has a sharp edge. This enables a transition between the connecting hose and the functional unit to be designed free of grooves. Grooves of this type can cause turbulence in the flowing water and in this way unintentionally reduce an available effective cross section at the transition.

It can be provided, for example, that the sharp edge is configured by a non-radiused tool. In this way, a simple tool for achieving an ideally smooth transition can be used, in particular in thermoplastic forming.

Alternatively or additionally it can be provided that the encircling rim is configured to adjoin the valve so as to be flush therewith. As a result, constrictions of the flow cross section and/or an increase in a flow resistance can often be avoided. The avoidance of any unevenness at the transition also reduces the possibility of deposits of contaminations in this region.

In one design embodiment of the invention it can be provided that the functional unit is a mixer cartridge. A frequent specific application can thus be catered for.

In one design embodiment of the invention it can be provided that the connecting hose is a mixer water hose. The invention utilizes the fact that the mixer water hose is often exposed to a low operating pressure and that stress on the fluidic connection on the holding lip can be reduced in this way.

Proposed for achieving the object mentioned in one preferred application is a sanitary fitting having a water-conducting arrangement according to the invention, in particular as described above and/or according to one of the claims directed toward a water-conducting arrangement.

It can be provided here, for example, that the connecting hose as the outlet hose is guided to a water outlet of the sanitary fitting. It can thus be achieved that an operating pressure differs only slightly from an ambient pressure when a pressure loss across the water outlet is minor. This simplifies the requirements set for durable tightness on the holding lip.

Alternatively or additionally it can be provided here that at least one inflow hose of the functional unit, in particular of the valve, has a hose stem. In this way, a pressure-resistant connection by way of the hose stem on the functional unit can be combined with the connector described by way of a holding lip, for example on the outlet side.

BRIEF DESCRIPTION OF THE DRAWINGS

The invention will be described in more detail hereunder by means of exemplary embodiments but is not limited to these exemplary embodiments. Further exemplary embodiments are derived by combining the features of individual or several claims with one another and/or with individual or several features of the exemplary embodiments.

In the figures.

DETAILED DESCRIPTION

FIGS. 1 to 6 and 9 show a first exemplary embodiment and will be described collectively hereunder.

A sanitary fitting, which as an entity is identified by the reference sign 1, has a water-conducting arrangement 2. This water-conducting arrangement 2 comprises at least one sanitary functional unit 3, a connecting hose 4 and further connecting hoses 5.

The functional unit 3 has two inputs and one output, wherein the further connecting hoses 5 are connected to the inputs and the connecting hose 4 is connected to the output.

A holding lip 7 is configured on an end 6 of the connecting hose 4 that faces the functional unit 3.

The functional unit 3 has a functional body 8 and a support plate 9.

The further connecting hoses 5, in a manner known per se, have in each case one connector part 10 which comprises a hose stem 13 and a crimping sleeve 14. The connector parts 10, in a manner known per se, are suspended in hose receptacles 11 on the support plate 9.

The holding lip 7 of the connecting hose 4 is suspended directly, without a separate connector, in a hose receptacle 12 on the support plate 9.

The holding lip 7 here is made from the same material as the connecting hose 4 and is integrally molded on the connecting hose 4.

The connecting hose 4 is composed of a thermoplastics material which has been correspondingly cut to size prior to assembly. The holding lip 7 on the connecting hose 4 has been thermoplastically formed from the hose material with the aid of a heated tool stamp such that the hose material has been bulged in order for the holding lip 7 to be formed.

Figure 4:
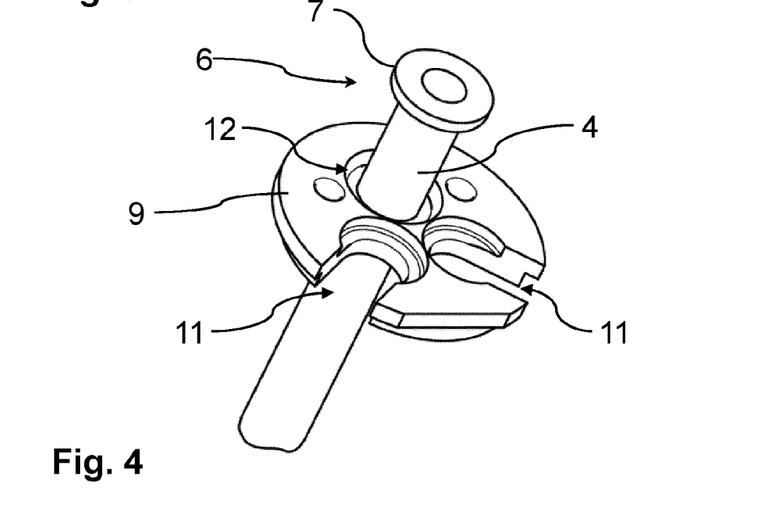
FIG. 4 shows a connecting hose of the water-conducting arrangement according to FIG. 1 in an oblique view from above, for illustrating the assembly procedure.

It can be seen in FIG. 4 that the hose receptacle 12 is configured so as to be closed in an encircling manner such that the connecting hose 4 has to be threaded through the hose receptacle 12 and pulled through up to the holding lip 7 during assembly.

In the exemplary embodiment shown, the functional unit 3 is configured as a valve 15 which, for controlling the flow from the further connecting hoses 5 into the connecting hose 4, is activable by an externally accessible activation element 16.

The connecting hose 4 is thus designed as an outlet hose 17 which at the low-pressure side of the functional unit 3 is connected in the manner described to a holding lip 7.

Figures 5, 6:
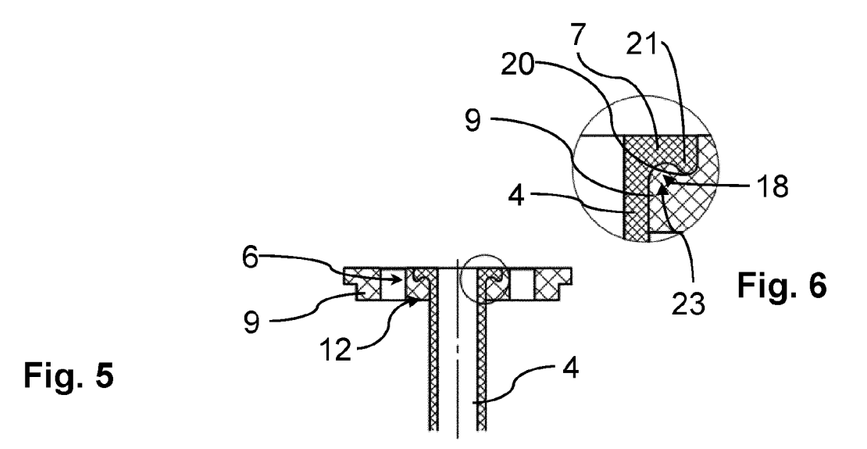
FIG. 5 shows a sectional illustration through a connecting hose of the water-conducting arrangement according to FIG. 1 in an axial sectional illustration.
FIG. 6 shows a detail from FIG. 5.

It can be seen in FIGS. 5 and 6 that the lower side 18 of the holding lip 7 is not of a planar configuration but has a structure.

Configured as a result of this structure is a tie 19 which acts in the radial direction and prevents that the holding lip 7 is pulled through the hose receptacle 12. This risk may exist, for example, when the connecting hose 4 by hot water flowing therein is heated to the extent that the dimensional stability is significantly reduced or no longer present.

The tie 19 mentioned in the exemplary embodiment is formed by a rib 20 on the lower side 18, which engages in a corresponding groove 21 on a bearing face 22 for the holding lip 7 on the support plate 9.

The groove 21 thus forms a mating tie 23 which, when interacting with the tie 19, has the effect that the holding lip 7 is radially secured and fixed.

A sealing face 25 which enables axial sealing is configured on an upper side 24 of the holding lip 7.

Since the connecting hose 4 in this exemplary embodiment is configured and used as the outlet hose 17, the upper side 24 is the inflow side 26.

A matching mating sealing face 27 having an axially sealing annular ring 28 is configured on the functional body 8. The functional body 8 in the use position is pressed against the support plate 9 such that the tie 19 and the mating tie 23 are held in the operative position, on the one hand, and the annular seal 28 is compressed against the sealing face 25 in order to effect sealing, on the other hand.

Figure 2:
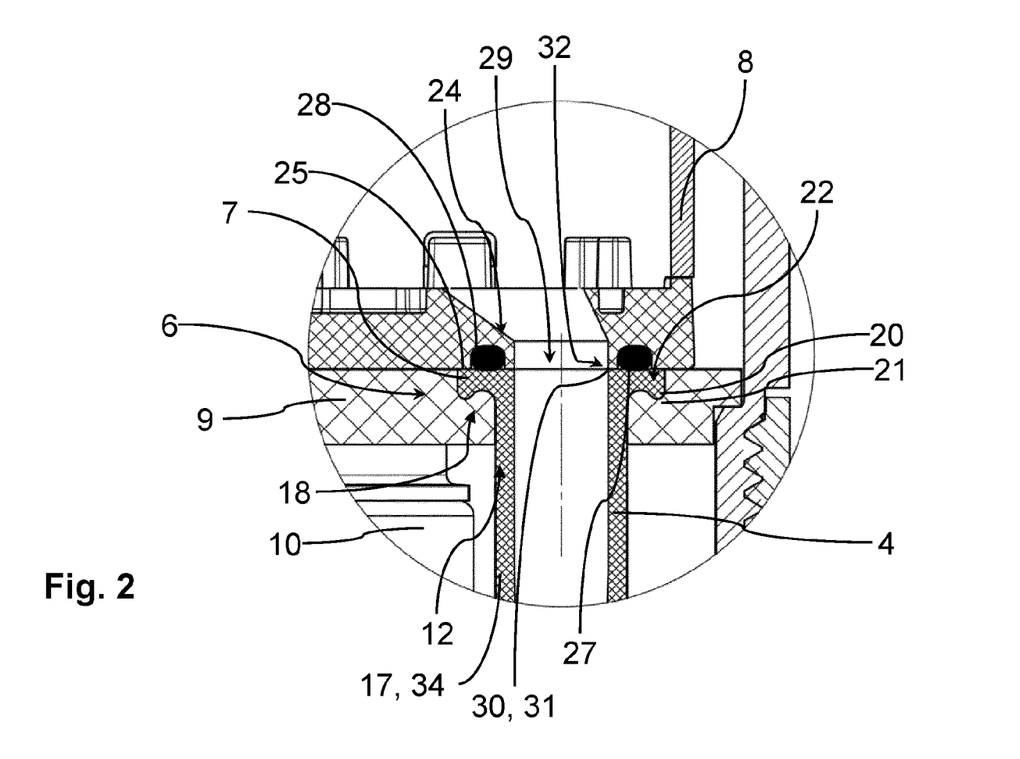
FIG. 2 shows a detail from FIG. 1.
Figure 3:
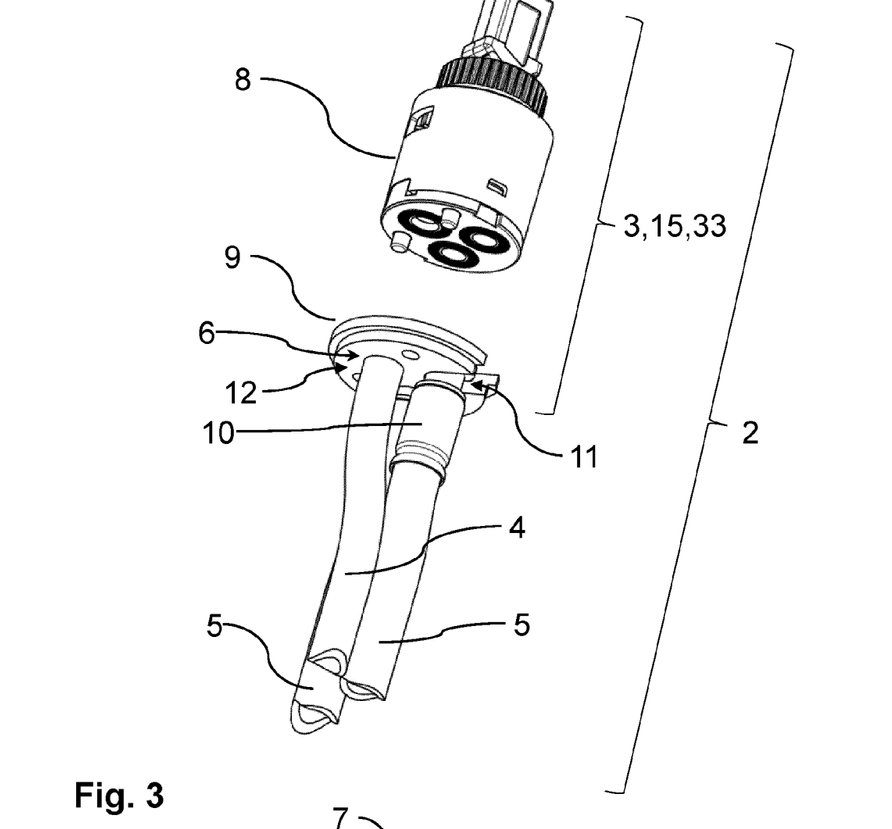
FIG. 3 shows the functional unit having connecting hoses from FIG. 1, in a partially disassembled state.

It can also be seen in the detailed illustration according to FIG. 2 that an entry opening 29 of the connecting hose 4 is configured on the end 6, said entry opening 29 having a sharp-edged rim 30 or a non-radiused edge 31. Achieved as a result is a smooth transition 32 to the functional body 8 without any unevenness in the wall of the liquid routing being able to lead to turbulence.

Figure 1:
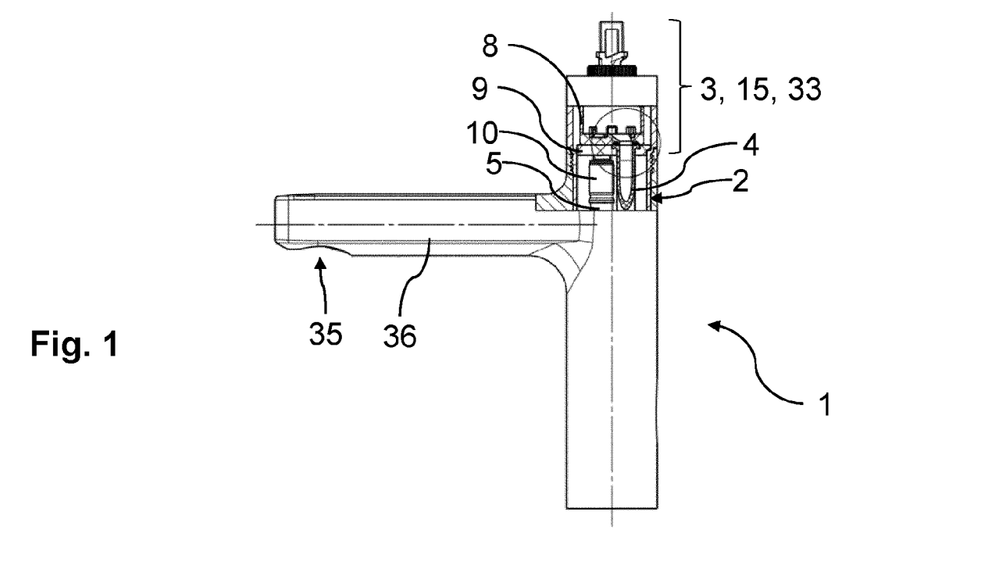
FIG. 1 shows a sanitary fitting having a water-conducting arrangement according to the invention in a partially sectional illustration.

The valve 15 is a mixer cartridge 33, wherein the connecting hose 4 as the mixer water hose 34 is routed to the water outlet 35 at the end of the outlet pipe 36.

Figures 7, 8:
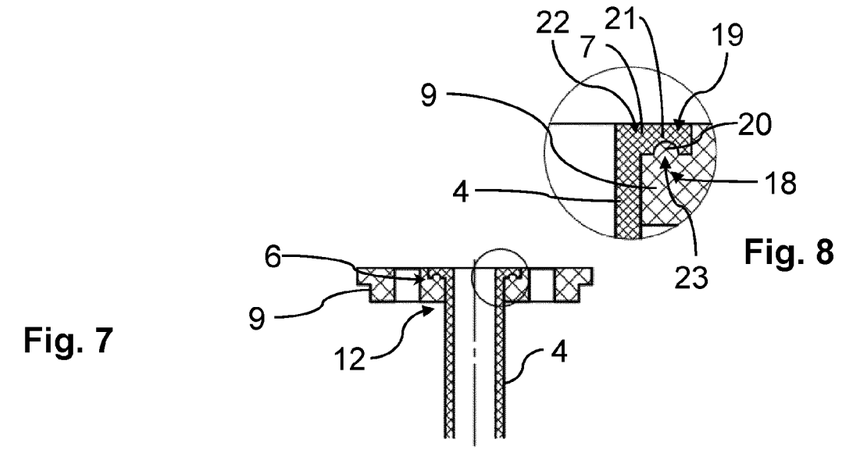
FIG. 7 shows a variant of a connecting hose analogous to the illustration according to FIG. 5.
FIG. 8 shows a detailed illustration from FIG. 7.
Figure 9:
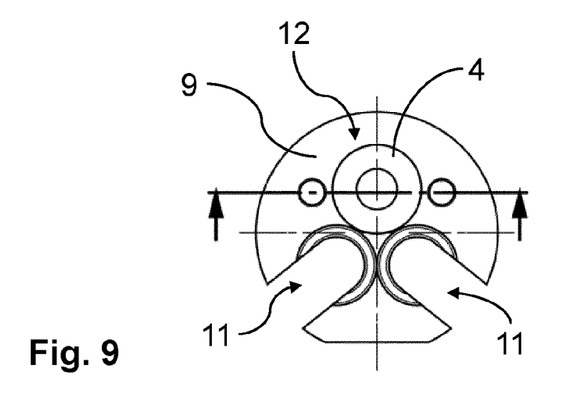
FIG. 9 shows a view of an inflow side of a support plate of the water-conducting arrangement according to FIG. 1, for explaining the position of the section in FIG. 5.
Figure 10:
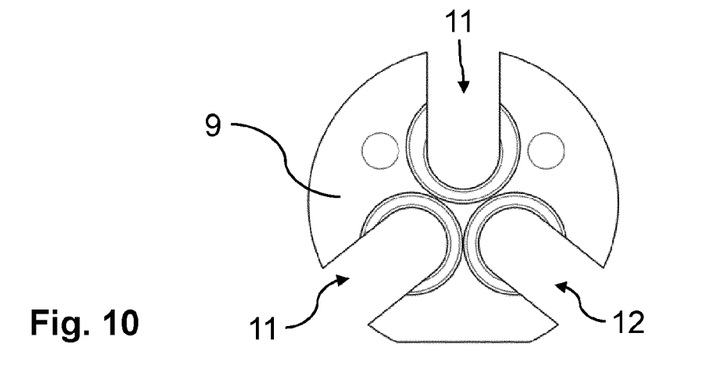
FIG. 10 shows a variant of a support plate analogous to FIG. 9.
Figure 11:
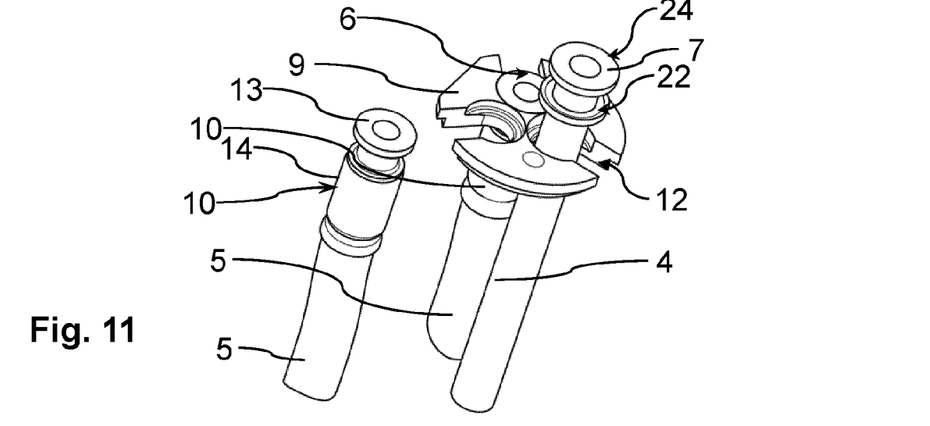
FIG. 11 shows the use of a connecting hose having a holding lip on a support plate according to FIG. 10.
Figure 12:
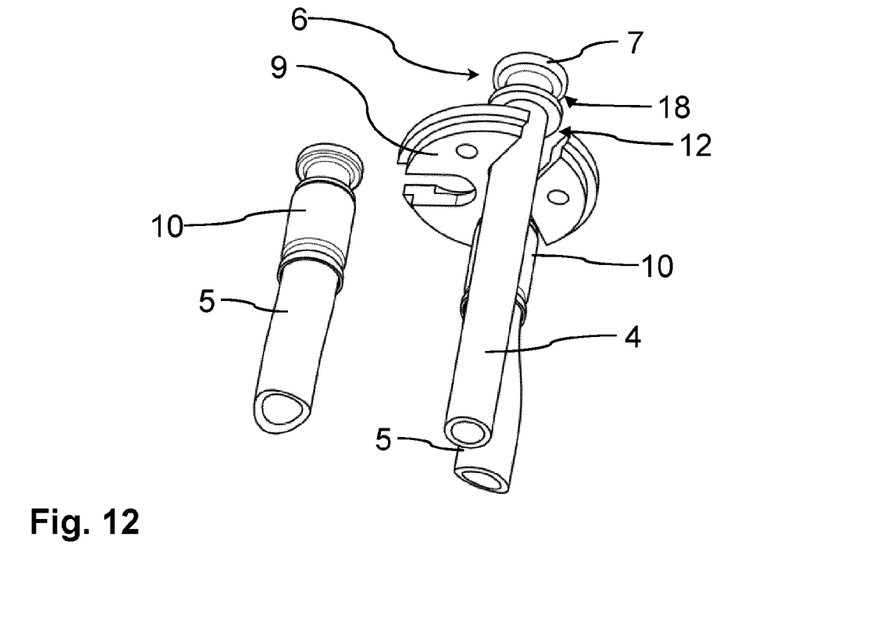
FIG. 12 shows a view analogous to FIG. 11, from obliquely below toward an outflow side of the support plate.
Figures 13, 14:
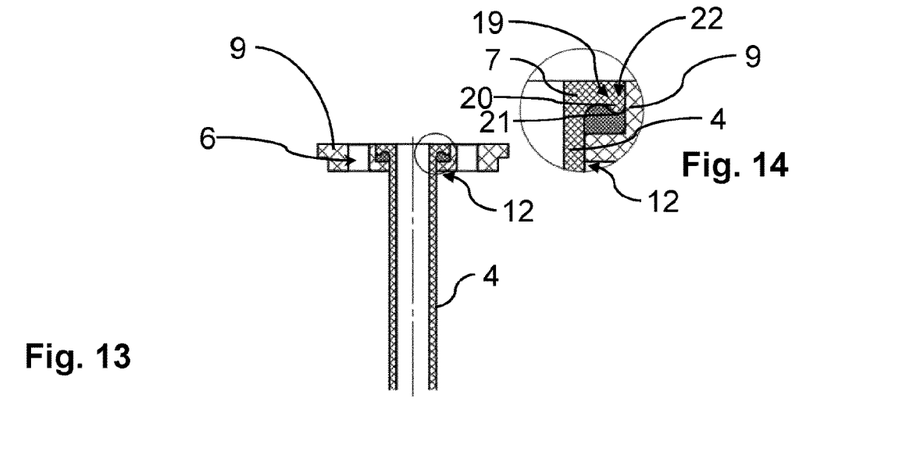
FIG. 13 shows an axial sectional illustration analogous to FIG. 5 of a further variant of a connecting hose having a holding lip and a support disk.
FIG. 14 shows a detailed illustration from FIG. 13.
Figure 15:
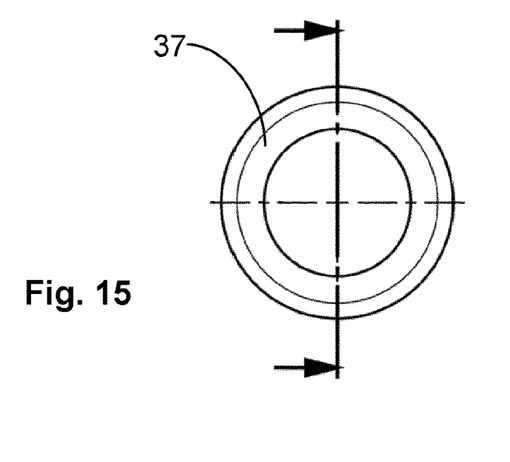
FIG. 15 shows a view toward the inflow side of a support disk from FIG. 13.
Figure 16:
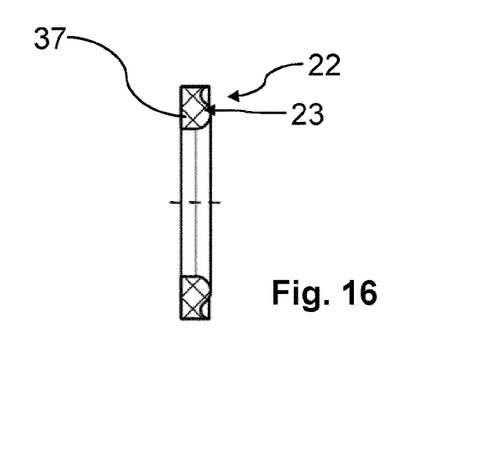
FIG. 16 shows an axial sectional illustration of the support disk according to FIG. 15.
Figure 17:
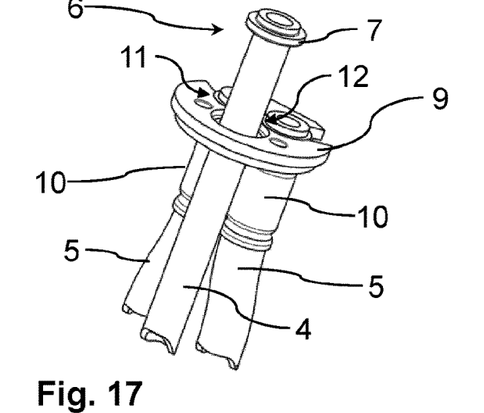
FIG. 17 shows a three-dimensional oblique illustration for explaining the assembly of an arrangement according to FIG. 13.
Figure 18:
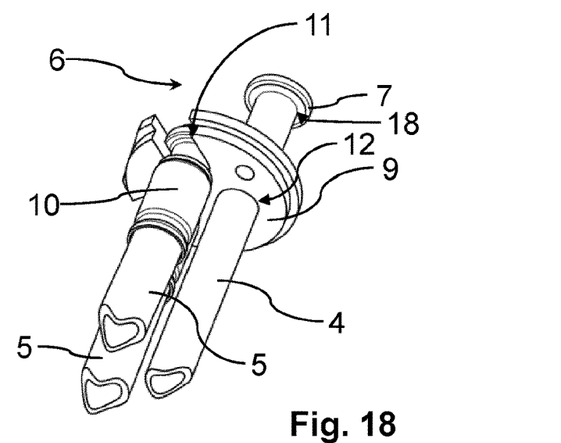
FIG. 18 shows a view toward the outflow side of the support plate from FIG. 17.
Figures 19, 20:
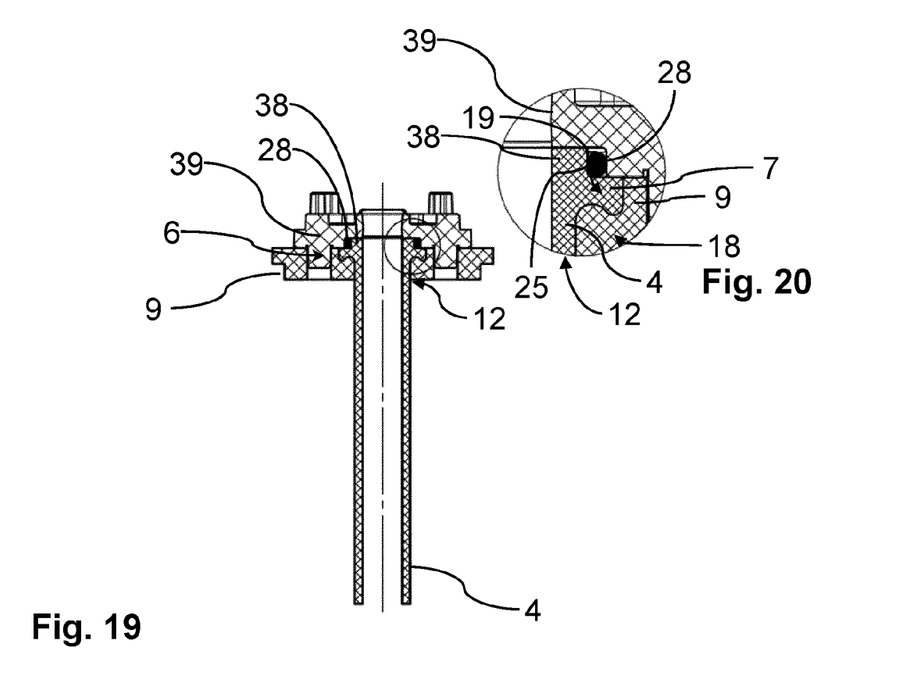
FIG. 19 shows an axial sectional illustration analogous to FIG. 5 of a further variant of a connecting hose having a holding lip.
FIG. 20 shows a partial illustration from FIG. 19.

FIGS. 7 and 8 show a variant of a combination of a connecting hose 4 with a support plate 9, as could be installed in the water-conducting arrangement 1 according to FIGS. 1 to 4 instead of the combination according to FIG. 5.

Components and functional units which are equivalent or identical in terms of function and/or construction to the preceding exemplary embodiment are provided with the same reference signs and not specifically described once again. The explanations pertaining to the preceding exemplary embodiment therefore apply in an analogous manner to FIGS. 7 and 8.

In the exemplary embodiment according to FIGS. 7 and 8, the tie 19 and the mating tie 23 are configured by a rib 20 in the bearing face 22 and a corresponding groove 21 on the lower side 18 of the holding lip 7.

In further exemplary embodiments, other combinations of grooves and ribs or other means for effecting a form-fit are implemented.

FIGS. 10 to 16 show a further exemplary embodiment. Again, components and functional units which are equivalent or identical in terms of function and/or construction to the preceding exemplary embodiments are provided with the same reference signs and not specifically described once again. The explanations pertaining to FIGS. 1 to 9 therefore apply in an analogous manner to FIGS. 10 to 16.

The exemplary embodiment according to FIGS. 10 to 16 differs from the preceding exemplary embodiments in that the hose receptacle 12 is open laterally, as has been the case already in the hose receptacles 11.

In order to grip the holding lip 7 on all sides here, a support disk 37 which configures the bearing face 22 is placed into the hose receptacle 12.

The support disk 37 here is made from a non-thermoplastics material, for example from metal. The support disk 37 in the exemplary embodiment is stamped or bent.

In further exemplary embodiments, the support disk 37 is made from a non-metallic material, for example from a plastics material.

In further exemplary embodiments, sharp-edged structures, for example holding claws, by way of which the support disk 37 can interlock in the holding lip 7, can be configured on the bearing face 22.

FIGS. 17 to 20 show a further exemplary embodiment according to the invention. Again, components and functional units which are equivalent or identical in terms of function and/or construction to the preceding exemplary embodiments are provided with the same functional units and not specifically described once again. The explanations pertaining to FIGS. 1 to 16 therefore apply in an analogous manner to FIGS. 17 to 20.

The exemplary embodiment according to FIGS. 17 to 20 differs from the preceding exemplary embodiments in that no axially acting sealing face 25, but a neck 38, is configured on the inflow end 6. This neck 38 forms a radially oriented sealing face 25 which engages in an annular seal 28 that is inserted into a lower part 39 of the functional body 8 and is radially compressed.

In the water-conducting arrangement 1 it is thus proposed according to the invention that a holding lip 7 is integrally molded on an end 6 of the connecting hose 4, said holding lip 7 engaging behind a hose receptacle 12 in order for the connecting hose 4 to be suspended.

LIST OF REFERENCE SIGNS

1 Sanitary fitting
2 Water-conducting arrangement
3 (Sanitary) functional unit
4 Connecting hose
5 Further connecting hose
6 End
7 Holding lip
8 Functional body
9 Support plate
10 Connector part
11 Hose receptacle
12 Hose receptacle
13 Hose stem
14 Crimping sleeve
15 Valve
16 Activation element
17 Outlet hose
18 Lower side
19 Tie
20 Rib
21 Groove
22 Bearing face
23 Mating tie
24 Upper side
25 Sealing face
26 Inflow side
27 Mating sealing face
28 Annular seal
29 Entry opening
30 Rim
31 Edge
32 Transition
33 Mixer cartridge
34 Mixer water hose
35 Water outlet
36 Outlet pipe
37 Support disk
38 Neck
39 Lower part

The invention claimed is:

1. A water-conducting arrangement (2), comprising:
a functional unit (3);
a connecting hose (4) having an end (6) that faces the functional unit (3);
a molded holding lip (7) integrally configured on the end that faces the functional unit, and the holding lip (7) is suspended on a hose receptacle (11) of the functional unit; and
a radially acting tie (19) configured on the holding lip (7).

2. The water-conducting arrangement (2) as claimed in claim 1, the connecting hose (4) is made from a thermoplastics material.

3. The water-conducting arrangement (2) as claimed in claim 1, wherein the hose receptacle (11) is open laterally, or in that the hose receptacle (11) is configured so as to be closed in an encircling manner.

4. The water-conducting arrangement (2) as claimed in claim 1, wherein the radially acting tie (19) is formed by a rib (20) or a groove (21) on a lower side (18) of the holding lip (7).

5. The water-conducting arrangement (2) as claimed in claim 1, wherein the holding lip (7) is pressed against a bearing face (22) on the hose receptacle (11).

6. The water-conducting arrangement (2) as claimed in claim 5, wherein the bearing face (22) on the hose receptacle (11) is configured to correspond to the holding lip (7).

7. The water-conducting arrangement (2) as claimed in claim 1, wherein the hose receptacle (11) has an encircling support disk (37) on which the holding lip (7) bears.

8. The water-conducting arrangement (2) as claimed in claim 1, further comprising a sealing face (25) configured on the end (6) of the connecting hose (4).

9. The water-conducting arrangement (2) as claimed in claim 1, further comprising an axially acting sealing face (25) configured on an inflow side (26) of the holding lip (7), and an axially acting mating sealing face (27) configured on the functional unit.

10. The water-conducting arrangement (2) as claimed in claim 1, further comprising a radially acting sealing face (25) configured on a neck (38) which on an inflow side (26) projects beyond the holding lip (7).

11. The water-conducting arrangement (2) as claimed in claim 1, further comprising an encircling rim (30) of an entry opening (29) on the end (6) of the connecting hose (4), the encircling rim has a sharp edge (31) which adjoins the functional unit so as to be flush therewith.

12. The water-conducting arrangement (2) as claimed in claim 1, wherein the functional unit comprises a valve (15) including a mixer cartridge (33).

13. A sanitary fitting (1) comprising the water-conducting arrangement (2) as claimed in claim 1, wherein the connecting hose (4) comprises an outlet hose (17) that is guided to a water outlet (35) of the sanitary fitting (1).

14. The sanitary fitting of claim 13, wherein at least one inflow hose of the functional unit includes a hose stem (13).

15. The water-conducting arrangement of claim 1, wherein the functional unit is a valve.

16. The water-conducting arrangement of claim 1, wherein the holding lip is configured by thermoplastic forming.

17. The water-conducting arrangement of claim 4, wherein the radially acting tie comprises an encircling groove or rib.

18. The water-conducting arrangement of claim 7, wherein the support disk is configured as at least one of a stamping, a bent part, a diecast part, a thermoplastics part.

19. The water-conducting arrangement of claim 7, wherein the bearing face for the holding lip (7) has sharp-edged structures, preferably at least one holding claw.

* * * * *